United States Patent
Garofalakis et al.

(10) Patent No.: US 6,330,609 B1
(45) Date of Patent: Dec. 11, 2001

(54) ADMISSION CONTROL SYSTEM AND METHOD FOR MEDIA-ON-DEMAND SERVERS

(75) Inventors: Minos N. Garofalakis, Madison, WI (US); Yannis E. Ioannidis, Athens (GR); Banu Ozden; Abraham Silberschatz, both of Summit, NJ (US)

(73) Assignee: Lucent Technologies, Inc., NJ (US)

( * ) Notice: Subject to any disclaimer, the term of this patent is extended or adjusted under 35 U.S.C. 154(b) by 0 days.

(21) Appl. No.: 08/966,095

(22) Filed: Nov. 7, 1997

(51) Int. Cl.$^7$ .................................................. G06F 15/16
(52) U.S. Cl. ............................................................ 709/229
(58) Field of Search ................................... 709/229, 219, 709/225, 203; 711/167

(56) References Cited

U.S. PATENT DOCUMENTS

| | | | |
|---|---|---|---|
| 5,410,343 | * | 4/1995 | Coddington et al. ................... 348/7 |
| 5,446,735 | * | 8/1995 | Tobagi et al. ........................ 370/445 |
| 5,473,362 | * | 12/1995 | Fitzgerald et al. ...................... 348/7 |
| 5,544,313 | | 8/1996 | Shachnai et al. ..................... 709/219 |
| 5,544,318 | | 8/1996 | Schmitz et al. . |
| 5,544,327 | | 8/1996 | Dan et al. . |
| 5,548,724 | * | 8/1996 | Akizawa et al. ..................... 709/203 |
| 5,583,995 | | 12/1996 | Gardner et al. . |
| 5,592,470 | * | 1/1997 | Rudrapatna et al. ................ 370/320 |
| 5,633,810 | | 5/1997 | Mandal et al. . |
| 5,636,139 | | 6/1997 | McLaughlin et al. . |
| 5,642,152 | | 6/1997 | Douceur et al. . |
| 5,646,676 | | 7/1997 | Dewkett et al. . |
| 5,708,796 | | 1/1998 | Ozden et al. ......................... 711/167 |
| 5,720,037 | | 2/1998 | Biliris et al. ......................... 345/327 |
| 5,754,773 | | 5/1998 | Ozden et al. ......................... 709/203 |
| 5,845,279 | | 12/1998 | Garofalakis et al. ..................... 707/7 |
| 5,926,649 | | 6/1999 | Ma et al. . |
| 5,964,829 | | 10/1999 | Ozden et al. ......................... 709/102 |
| 6,115,740 | | 9/2000 | Mizutani ............................. 709/217 |

OTHER PUBLICATIONS

P. V. Rangan and H. M. Vin, "Designing File Systems for Digital Video and Audio" in Proceedings of the Thirteenth ACM Symposium on Operating Systems Principles, pp. 81–94.

A. Dan and D. Sitaram, "An Online Video Placement Policy based on Bandwidth to Space Ratio (BSR)" in Proceedings of the 1995 ACM SIGMOD International Conference on Management of Data, 1995.

B. Özden, R. Rastogi, and A. Silberschatz 1995, "Framework for the Storage and Retrieval of Continuous Media Data" in Proceedings of the 1995 International Conference on Multimedia Computing and Systems, pp. 2–13, 1991.

J. L. Wolf, P.S. Yu and H. Shachnai, "DASD Dancing: A Disk Load Balancing Optimization Scheme for Video–On–Demand Computer Systems" in Proceeding of the 1995 ACM SIGMETRICS Conference on Measurement & Modeling of Computer Systems, 1995.

Garofalakis, Ozden Silberschatz, "Resource Scheduling in Enhanced Pay–Per–View Continuous Media Databases," In Proceedings of the 23rd International Conference on Very Large Data Bases, Athens, Greece, Aug. 1997.

(List continued on next page.)

Primary Examiner—Krisna Lim (57) ABSTRACT

In a server system having a predetermined total bandwidth providing data files to a plurality of clients in response to requests received from the clients, a method for providing admission control comprises the steps of allocating a plurality of channel partitions to a plurality of channel groups such that each channel group includes one or more of the channel partitions. The system then obtains a channel group number based on the length of the data file requested by one of the clients and transmits the requested data file when a channel group corresponding to the obtained channel group number contains a vacant channel partition.

42 Claims, 6 Drawing Sheets

OTHER PUBLICATIONS

Amotz Bar–Noy et al, Bandwidth Allocation with Preemption In proceedings of the 27th Annual ACM Symposium on the Theory of Computing, pp616–625, Las Vegas, Nevada 1995.

S. Baruah et al., "On the Competitiveness of On–Line Real–Time Task Scheduling" In Proceedings of the 12th IEEE Real–Time Systems symposium, pp106–115, San Antonio, Texas, Dec. 1991.

Baruch Awerbuch et al, "Competitive Non–Preemptive Call Control" In Proceedings of the Fifth Annual ACM–SIAM Symposium on Discrete Algorithms, pp312–320, Arlington, VA, Jan. 1994.

Baruch Awerbuch et al, "Throughput–Competitive On–Line Routing" In Proceedings of the 34the Annual IEEE Symposium on Foundations of Computer Science, pp32–40, Palo Alto, CA, Nov. 1993.

Yossi Azar et al, "On–line Load Balancing" Theoretical Computer Science, 130:73–84, 1994.

Mon–Song Chen et al, "Optimization of the Grouped Sweeping Scheduling (GSS) with Heterogeneous Multimedia Streams" In Proceedings of ACM Multimedia '93, pp235–242, Anaheim, CA, Aug. 1993.

Gilad Koren and Dennis Shasha, "An Optimal Scheduling Algorithm with a Cokmpetitive Factor for Real–Time Systems" Technical Report TR572, Dept. Of Computer Science, New York University, Jul. 1991.

R.J. Lipton and A. Tompkins, "On–line Interview Scheduling" In Proceedings of the Fifth Annual ACM–SIAM Symposium on Discrete Algorithms, pp302–311, Arlington, VA, Jan. 1994.

J. Westbrook, "Load Balancing for Response Time" In Proceedings of the 3rd Annual European Symposium on Algorithms (ESA '95); pp355–368, Corfu, Greece, Sep. 1995.

James Aspnes, "On–Line Routing of Virtual Circuits with Applications to Load Balancing and Machine Scheduling" Journal of the ACM, vol. 44, No. 3:486–504, May 1997.

* cited by examiner

FIG. 2B
FLAG DATA STRUCTURE

ADMISSION CONTROL SYSTEM AND METHOD FOR MEDIA-ON-DEMAND SERVERS

FIELD OF THE INVENTION

The present invention relates to an admission control system in a client-server environment, and specifically to such a control system for media-on-demand applications.

BACKGROUND OF THE INVENTION

Recent advances in communication, computing and storage technologies have led to new continuous media applications with high resource and stringent performance requirements. For example, some available media-on-demand systems are capable of providing media clips such as movies to clients on a real-time basis. Thus, a plurality of clients may request and retrieve one or more media contents as desired. Typically, the media contents, such as videos are stored on secondary storage devices on the server and delivered to the clients.

There has been some solutions suggested in literature to improve quality of service for media servers. For example, one solution to overcome memory bottlenecking problems provides an arrangement of a media server system that statistically replicates popular movies on multiple secondary storage devices based on the expected load, such that the total demand for the movie can be spread among the devices having a copy of the movie.

Another solution employs dynamic replication mechanisms, such that movies or portions of movies are copied, as a function of present demand, from heavily loaded storage devices to more lightly loaded storage devices.

Further approaches include "round-based" disk scheduling arrangement intended to handle real-time requirements of continuous media data as described in *Designing File Systems for Digital Video and Audio* in Proceedings of the Thirteenth ACM Symposium on Operating Systems Principles, pp. 81–94 (P. V. Rangan and H. M. Vin 1991); *A Framework for the Storage and Retrieval of Continuous Media Data* in Proceedings of the 1995 International Conference on Multimedia Computing and Systems, pp. 2–13 (B. Özden, R. Rastogi, and A. Silberschatz 1995); *The Storage and Retrieval of Continuous Media Data* in Multimedia Database Systems: Issues and Research Directions, pp. 237–261 (B. Özden, R. Rastogi, and A. Silberschatz 1996).

Another solution described in *An Online Video Placement Policy based on Bandwidth to Space Ratio (BSR)* in Proceedings of the 1995 ACM SIGMOD International Conference on Management of Data, (A. Dan and D. Sitaram 1995) presents a simulation based study of a load balancing arrangement for video servers. Similarly, *DASD Dancing: A Disk Load Balancing Optimization Scheme for Video-On-Demand Computer Systems* in Proceeding of the 1995 ACM SIGMETRICS Conference on Measurement & Modeling of Computer Systems (J. L. Wolf, P. S. Yu and H. Shachnai 1995) describes a system that employs dynamic load-balancing arrangement based on a heuristic graph-based algorithm employing combinatorial optimization techniques.

Although the above references and other available references describe systems and methods that can improve the performance of media servers and specifically the total throughput of such servers, there is a need for improving resource scheduling of such servers regardless of the throughput available by the server. Such resource scheduling is intended to improve the use of the total available throughput of a server system as explained hereinafter.

SUMMARY OF THE INVENTION

In accordance with one embodiment of the invention in a server having a predetermined total bandwidth providing data files to a plurality of clients in response to requests received from said clients, a method for providing admission control comprises the steps of obtaining a ratio $\Delta$ corresponding to the largest specifiable duration of one of said requests over the smallest specifiable duration of one of said requests. The total available bandwidth is then divided into $\lceil \log \Delta \rceil$ bandwidth partitions having a corresponding partition number. When a request arrives to the server, the length of the content corresponding to the request is evaluated. A partition number is then assigned to that request based on the length of the data file requested. The bandwidth corresponding to that partition is checked to determine whether an available bandwidth exists. If so the request is acknowledged and served. In the alternative, if an available bandwidth does not exist, the request is denied.

DETAILED DESCRIPTION OF THE INVENTION

In accordance with various embodiments of the present invention, a media-on-demand, MOD, server is configured to transmit media clips, such as video, audio and text data in response to a collection of different content requests, wherein each request has a predetermined length and bandwidth requirement. Various media clips available for transmission are stored in the form of data files. As such throughout the present discussion, media clips and data files are used interchangeably.

The media-on-demand server of the present invention may be viewed as a "black box" capable of offering a sustained bandwidth capacity of B. The input sequence of customer or client requests comprises a plurality of requests $\Sigma = \sigma_1, \sigma_2, \ldots, \sigma_N$ wherein the $i^{th}$ request by a client is represented as $\sigma_i=(t_i, l_i, r_i)$ where $l_i$, $r_i$ respectively denote the length and bandwidth requirement of the requested media clip and $t_i$ is the arrival time of $\sigma_i$. Given a collection of different requests that are handled by a server, based, for example, on the clips available at the server or the server's usage patterns, $l_{max}$ denotes the length of the longest request and $l_{min}$ denotes the length of the shortest request as specified by the media server's administrator. Furthermore, $r_{max}$ denotes the highest bandwidth requirement of a request and $r_{min}$ denotes the lowest bandwidth requirement of a request as specified by the media server's administrator. The ratio $$\frac{l_{max}}{l_{min}}$$

is referred to as $\Delta$.

In order to provide a frame of reference for the scheduling strategies employed in the present invention, it is desirable to contrast the performance of a media server in accordance with the present invention as compared with a "work conserving" (WC), or "greedy" scheduling algorithm. Briefly, the greedy scheduling algorithm schedules a transmission in response to a request $\sigma_i$, if the server has at least $r_i$ available bandwidth at time $t_i$; otherwise the server rejects the request $\sigma_i$. As will be explained in more detail below, the work conserving or greedy scheduling algorithm offers rather poor performance guarantees for a media-on-demand server system. One of the shortcomings of the greedy scheduling arrangement is that a request $\sigma_i$ arriving at time $t_j + \epsilon$, with a large benefit value [i.e. $l_i$. $r_i$] may be rejected in favor of a request $l_j$ arriving at time $t_j$ with a substantially small request value. This scenario would result in wasted throughput in the server system.

Furthermore, the performance of a media-on-demand server employing various scheduling arrangements in accordance with the present invention is measured based on a total throughput metric, which is defined as the bandwidth-time product over a given sequence of requests. More specifically, given an on-line scheduling arrangement A on an input sequence $\Sigma$ the benefit of A on $\Sigma$ is defined as $$V_A(\Sigma) = \sum_{i \in S_A} l_i \cdot r_i$$

where $S_A$ is the set of requests scheduled by the on-line scheduling arrangement A.

Thus, a competitive ratio $k(A)$ for a scheduling arrangement A may be defined as $$k(A) = \sup_{A^*, \Sigma} \frac{V_{A^*}(\Sigma)}{V_A(\Sigma)}$$

where $\Sigma$ ranges over all possible request sequences and A* is an off-line scheduling algorithm that can provide an optimum total throughput because of the knowledge of the length of requests. To this end a scheduling arrangement A is K-competitive when $k(A) \leq K$.

As will be explained in more detail hereinafter, the scheduling arrangements in accordance with various embodiments of the present invention provide an improved total throughput performance over work conserving or greedy scheduling arrangement.

Figure 1:
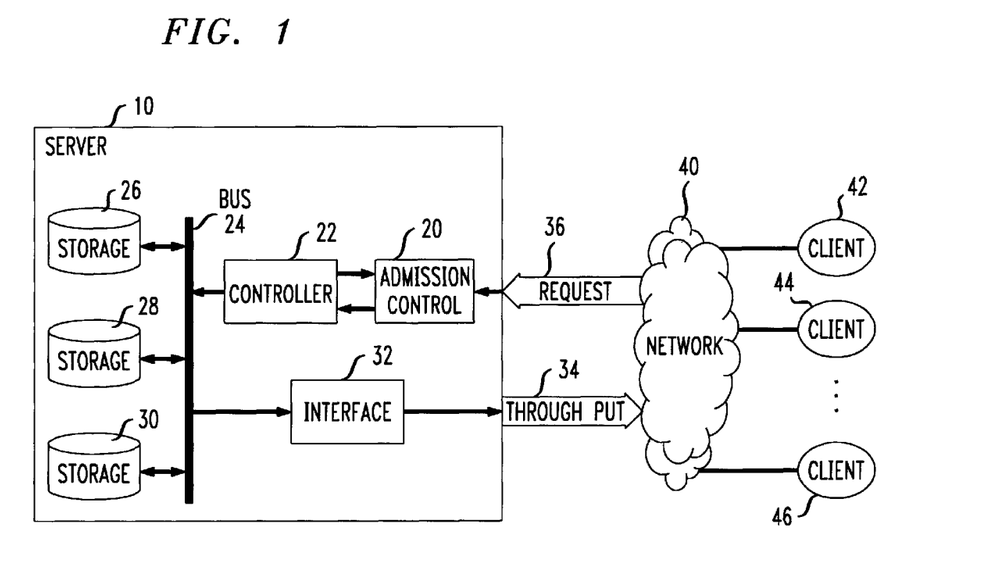
FIG. 1 illustrates a server system that employs the various embodiments of a scheduling arrangement in accordance with the present invention.

FIG. 1 illustrates a server system 10 that employs the various embodiments of a scheduling arrangement in accordance with the present invention, although the invention is not limited in scope to such a server system. For example, the scheduling arrangements described in accordance with the present invention may be employed in any server system that is required to allocate a bandwidth to serve a client's request, such as communication switches and routers.

Server system 10 is configured to provide data to a plurality of clients, such as 42, 44 and 46 via a communications network 40, in response to requests received from such clients. Network 40 may be any appropriate communication network such as Internet, or an asynchronous transfer mode (ATM) network. Server system 10 includes a plurality of storage devices such as 26, 28 and 30, which are configured to provide a plurality of media clips such as video image sequences, audio clip sequences and data bytes. These media clips are adapted to be transmitted to clients 42–46 and viewed in real-time.

Server system 10 also includes an admission control circuit 20, which is configured to analyze an incoming request and determine whether the request will be acknowledged or denied. The operation of admission control circuit in accordance with the present invention is described in more detail in reference with FIGS. 2–5. An input port of admission control circuit 20 is coupled to an input bus 36 which is configured to carry requests generated by clients 42–46. Admission control circuit 20 analyzes each request $\sigma_i$, among other things, based on the time the request arrives, $t_i$, the length of the request $l_i$, and the bandwidth or data rate $r_i$ necessary to serve the request.

Server system 10 also includes a controller 22 which is configured to control the operation of server system 10. In accordance with one embodiment of the invention, controller 22 is a microprocessor. An input port of controller 22 is coupled to an output port of admission control circuit 20. Furthermore an output port of controller 22 is coupled to an input port of admission control circuit 20.

Storage devices 26–30 are configured to provide data to an internal bus system 24 in response to signals provided by controller 22, although the invention is not limited in scope in that respect. For example other embodiments of server 10 comprise separate disk controllers, each of which typically has a maximum sustainable data rate at which it can provide data retrieved from all the disks it controls. For example, SCSI controllers have a typical sustainable data rate of about 4 megabytes per second, regardless of how many disks are controlled by that SCSI controller. Data retrieved from storage devices 26–30 are provided to network 40 via interface unit 32 and output bus 34.

The total bandwidth of server 10 depends upon many things including the system architecture, the type of storage devices that are used, the manner in which movie clips are stored and retrieved. Thus, the present invention may employ any one of the architecture arrangements that is best suited for a particular application. However, regardless of the type of the arrangement employed in server 10, in accordance with the principles of the invention, one of the main factors that is considered by the scheduling arrangement of the server is the total bandwidth which is defined as the aggregate input/output capacity of the server system for a sustainable period of time. It is noted that depending on the type of the server being employed the total bandwidth may be considered in units of frequency or in the alternative in units of data bit rate. The operation of admission control circuit 20 is explained in detail hereinafter.

Figure 2A:
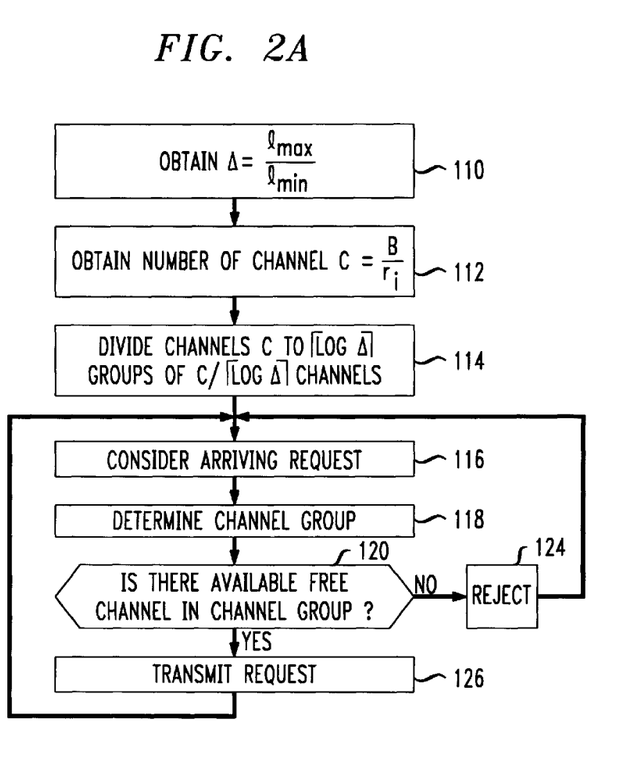
FIG. 2*a* illustrates a flow chart of steps performed by a data scheduling arrangement in accordance with the embodiment of the present invention.

FIG. 2a illustrates a flow chart of steps performed by a data scheduling arrangement referred herein as channel prepartitioning (CP) scheduling arrangement employed by admission control circuit 20 upon receiving a request from a client via network 40 and input bus 36, in accordance with one embodiment of the invention, although the invention is not limited in scope in that respect. Initially, admission control circuit 20 obtains the length of a request that is specified to be the maximum length of a clip, such as $l_{max}$. It is noted that this maximum length may be defined in different ways. For example, admission control 20 may retrieve the length of all the clips that are available for transmission by server 10 and designate the length of the longest clip as $l_{max}$. In accordance with another embodiment of the invention, server 10 may prompt a system administrator to specify the length of $l_{max}$ to be the maximum allowable length of a clip stored in server 10. Furthermore, in accordance with another embodiment of the invention, admission control circuit 20 may obtain the length of data file corresponding to incoming requests and dynamically designate the length of the longest data file as $l_{max}$.

Similarly, minimum length may be defined in different ways. For example, admission control 20 may retrieve the length of all the clips that are available for transmission by server 10 and designate the length of the shortest clip as $l_{min}$. In accordance with another embodiment of the invention, server 10 may prompt the system administrator to specify the length of $l_{min}$ to be the minimum allowable length of a clip to be stored in server 10. Furthermore, in accordance with another embodiment of the invention admission control circuit 20 may obtain the length of data files corresponding to incoming requests and dynamically designate the length of the shortest data file as $l_{min}$.

The channel prepartitioning (CP) scheduling arrangement employed in one embodiment of the invention as illustrated in FIG. 2a is based on the assumption that all input requests require a constant fraction of the server's bandwidth B, although the invention is not limited in scope in that respect. Thus the bandwidth required for each request i is referred to as $r_i$.

At step 110 admission control circuit 20 obtains a ratio $\Delta$ by dividing maximum length of a request $l_{max}$ to minimum length of a request $l_{min}$ as defined above. Thereafter, at step 112 admission control circuit 20 divides the total bandwidth B of server 10 into c available channel partitions. The number of the available channel partitions c is equal to $B/r_i$. It is noted that each of the available channel partitions may be viewed, for example, as one or more allocated time slots for a server system that transmits data in a time division multiple access TDMA arrangement. In accordance with another example each of the available channel partitions may be viewed as one or more allocated frequency bands for a server system that transmits data in a frequency division multiple access FDMA arrangement.

At step 114 admission control circuit 20 divides the number of available channel partitions c to $\lceil \log \Delta \rceil$ groups wherein $\Delta$ is the ratio derived at step 110. As a result, the number of channel partitions in each channel group "i" is $c/\lceil \log \Delta \rceil$, wherein i ranges between group 1 to group $\lceil \log \Delta \rceil$.

At step 116 admission control circuit 20 processes an incoming request, $\sigma_j$ and determines the length, $l_j$, of the clip that is requested. At step 118 admission control circuit determines the channel group i that is allocated to serve the incoming request based on the length $l_j$ such that $$2^{i-1} \cdot l_{min} \leq l_j < 2^i \cdot l_{min}$$

allowing for $l_j = 2^i \cdot l_{min}$ if $i = \lceil \log \Delta \rceil$.

Once the channel group is determined, admission control circuit 20 goes to decision step 120 so as to determine whether there is an available free channel partition in that channel group that can serve the incoming request $\sigma_j$. If so, at step 126, admission control circuit 20 sends a transmit authorization signal to controller 22 so as to cause the transfer of the clip requested. Otherwise admission control circuit 20 goes to step 124 so as to cause a denial to transmit the clip requested.

Figure 2B:
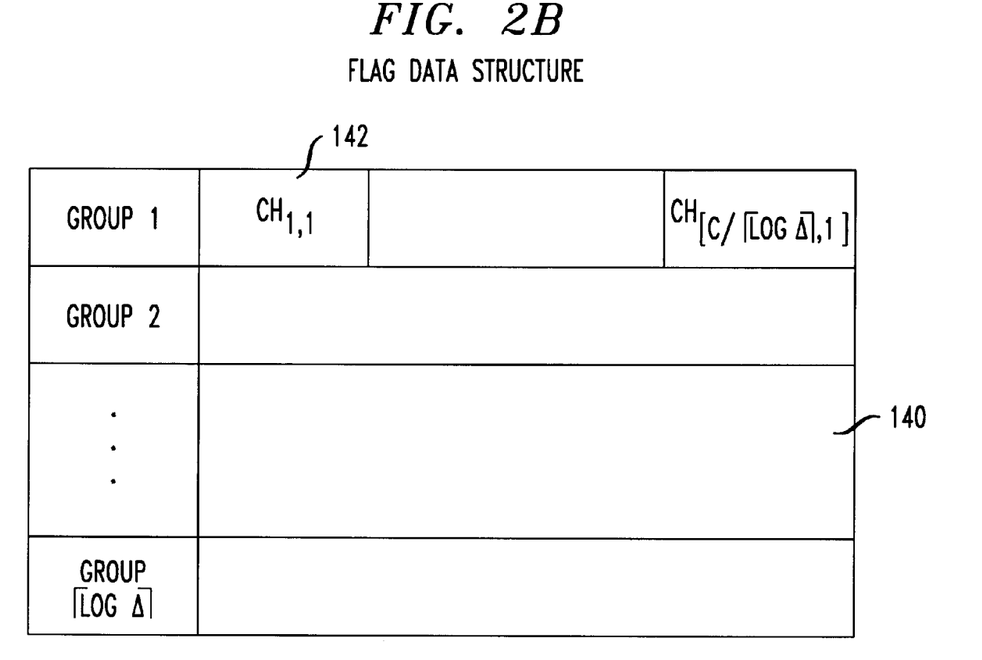
FIG. 2*b* illustrates the data structure of an admission control array in accordance with one embodiment of the invention.

FIG. 2b illustrates the data structure of an admission control array 140 in accordance with one embodiment of the invention, although the invention is not limited in scope to such an arrangement. Each channel group includes a plurality of array elements 142 which in accordance with the embodiment described in reference with FIG. 2a includes $c/\lceil \log \Delta \rceil$ elements per group, wherein c is the number of available channel partitions and $\Delta$ is the throughput ratio as defined hereinabove. Each array element 142 corresponds to a transmission channel partition employed by server system 10. Each array element 142 includes an indication flag which can be set to "in-use" or "vacant." Thus, an array element is set to "in-use" when admission control circuit 20 allocates the corresponding channel partition within a channel group for transmission of a clip in response to a request. Each array element is set to "vacant" when the server is not transmitting data via the corresponding channel partition.

Thus, in accordance with one embodiment of the invention, admission control circuit 20 at step 120 (FIG. 2a) examines the control array 140 to determine whether a free channel is available based on the status of the "in-use" or "vacant" flags as set in each array element.

The channel prepartitioning (CP) data scheduling arrangement in accordance with the embodiment described in reference with FIG. 2 exhibits a remarkable improvement over the work conserving or greedy scheduling arrangement described above. For example, the throughput competitive ratio for a work conserving (WC) or greedy data scheduling arrangement is $(1+\Delta)$- competitive, which means that the competitive ratio $k(WC) \leq 1+\Delta$. As a way of quantitative example, assuming that the longest clip is 100 minutes long and the short clip is 1 minute long, the competitive ratio of a greedy scheduling arrangement is 101 (1+100) times worse than an optimum off-line scheduling arrangement. On the other hand, the throughput competitive ratio for the data scheduling arrangement of one embodiment of the present invention is 3. $\lceil \log \Delta \rceil$- competitive, which means the competitive ratio $k(CP) \leq 3. \lceil \log \Delta \rceil$ for the embodiment described herein. Thus, for the same quantitative example, the competitive ratio of the embodiment described herein is only 30 (3 . log 100) times worse than an optimum off-line scheduling arrangement.

Although the scheduling arrangement described in FIG. 2a can guarantee a logarithmic competitiveness under a worst-case scenario, it may under-utilize the server in average cases. For example, when all the requests to the server address one specific group of channels, the channel prepartitioning (CP) algorithm in accordance with the present invention utilizes only $1/\lceil \log \Delta \rceil$ of the available bandwidth.

Figure 3:
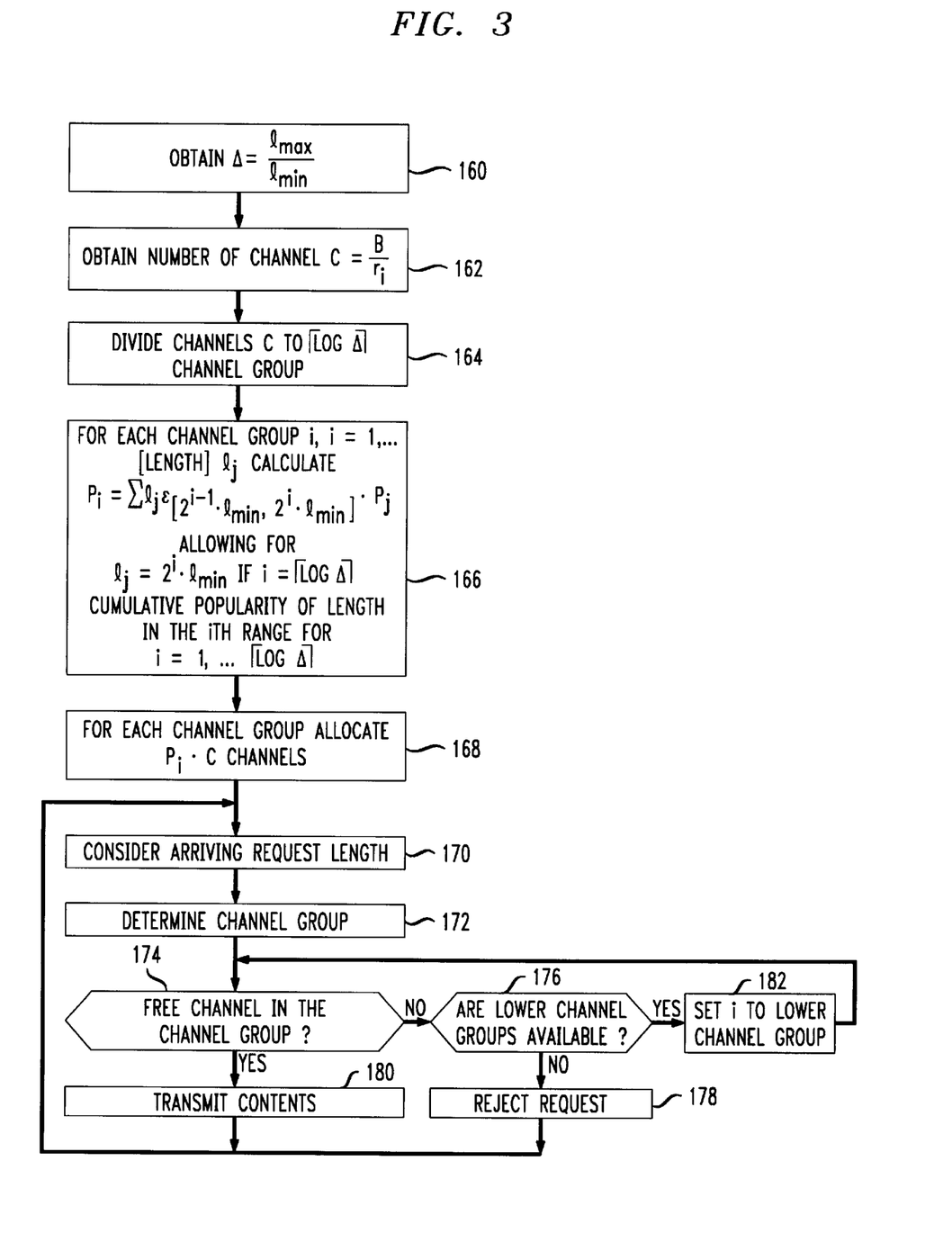
FIG. 3 illustrates a flow chart of the steps performed by a data scheduling arrangement in accordance with another embodiment of the invention.

FIG. 3 illustrates a flow chart of the steps performed by a popularity-based channel prepartitioning (PCP) data scheduling arrangement employed by admission control 20 in accordance with another embodiment of the invention that exhibits an improved performance compared to the channel prepartitioning (CP) arrangement described above.

The popularity-based channel prepartitioning (PCP) data scheduling arrangement includes the step of partitioning the total number of available channels into $\lceil \log \Delta \rceil$ channel groups as defined above in reference with FIG. 2a. The number of the channels, in each channel group i is based on the cumulative popularity of all requests with lengths in the range of $[2^{i-1} \cdot l_{min}, 2^i \cdot l_{min})$, allowing a request of length $2^{\lceil \log \Delta \rceil}$ in the $\lceil \log \Delta \rceil^{th}$ channel group. In accordance with one embodiment of the invention these popularities may be estimated with reasonable accuracy, for example, by employing "moving window" prediction methods as described in T. D. C. Little and D. Venkatesh, *Popularity Based Assignment of Movies to Storage Devices in a Video-on-Demand System*, ACM Multimedia Systems, Vol.2, pp 280–287 (1995), and incorporated herein by reference. By taking popularities into account situations that may lead to sever bandwidth underutilization in the system described in FIG. 2a may be avoided. Such underutilizations may occur, for example, when the most frequent requests are also the shortest.

The popularity based prepartitioning (PCP) data scheduling steps illustrated in FIG. 3 is based on the assumption that the products of the cumulative range popularities and the number of channels are integers, although the invention is not limited in scope in that respect. Furthermore, the popularity based prepartitioning (PCP) scheduling arrangement employed in one embodiment of the invention as illustrated in FIG. 3 is based on the assumption that all input requests require a constant fraction of the server's bandwidth B, although the invention is not limited in scope in that respect. Thus the bandwidth required for each request i is referred to as $r_i$.

At step 160 admission control circuit 20 obtains a ratio $\Delta$ by dividing maximum length of a request $l_{max}$ to minimum length of a request $l_{min}$ as defined above. Thereafter, at step 162 admission control circuit 20 divides the total bandwidth B of server 10 into c available channel partitions. The number of the available channel partitions c is equal to $B/r_i$. It is noted that each of the available channel partitions may be viewed, for example, as one or more allocated time slots for a server system that transmits data in a time division multiple access TDMA arrangement. In accordance with another example each of the available channel partitions may be viewed as one or more allocated frequency bands for a server system that transmits data in a frequency division multiple access FDMA arrangement.

At step 164 admission control circuit 20 divides the number of available channel partitions c to i channel groups wherein i ranges from 1 to $\lceil \log \Delta \rceil$ and $\Delta$ is the ratio derived at step 110. The number of channels in each channel group i is determined by steps 166 and 168. The range of request lengths allocated to channel group i is $[2^{i-1} \cdot l_{min}, 2^i \cdot l_{min})$ allowing for $l_j=2^i \cdot l_{min}$ if $i=\lceil \log \Delta \rceil$. Specifically at step 166, admission control circuit 20 for each length $l_j$, allocated to a channel group "i", calculates a cumulative popularity $P_i$, such that $$P_i = \Sigma l_j \cdot p_j$$

wherein $p_j$ is the probability that the length of an incoming request is $l_j$ in the $i^{th}$ range. As a result at step 168 admission control circuit 20 allocates the number of channels in each channel group "i" as $P_i \cdot c$, wherein i ranges between channel group 1 to channel group $\lceil \log \Delta \rceil$.

At step 170 admission control circuit 20 processes an incoming request, $\sigma_j$ and determines the length, $l_j$, of the clip that is requested. At step 172 admission control circuit determines the channel group i that is allocated to serve the incoming request based on the length $l_j$ such that $$2^{i-1} \cdot l_{min} \leq l_j < 2^i \cdot l_{min}$$

allowing for $l_j=2^i \cdot l_{min}$ if $i=\lceil \log \Delta \rceil$.

Once the channel group is determined, admission control circuit 20 goes to decision step 174 so as to determine whether there is an available free channel in that channel group that can serve the incoming request $\sigma_j$. If so, at step 180, admission control circuit 20 sends a transmit authorization signal to controller 22 so as to cause the transfer of the clip requested. Otherwise, admission control circuit employs a down-shifting arrangement. To this end it performs step 176 to determine whether there is an available channel partition within the lower channel groups. Each channel partition lower than the initial allocated channel group is checked, and if an available channel partition within that group exists, admission control circuit 20 goes to step 182 so as to allocate the free channel partition for transmission of the requested clip. Thereafter admission control circuit 20 goes back to step 170 to process the next incoming request. If at step 176, admission control circuit 20 determines that there are no available free channels in the lower groups, step 178 is performed to deny the incoming request. Thereafter, admission control circuit 20 goes back to step 170 to process the next incoming request. It is noted that a data structure based on the principles discussed in reference with FIG. 2b may be employed to set flags for "in-use" and "vacant" channel partitions for each channel group i.

It is further noted that the channel prepartitioning (CP) scheduling arrangement described in FIG. 2a may also employ the down-shifting approach described above in reference with FIG. 3. Thus, while channel prepartitioning (CP) scheduling arrangement described in reference with FIG. 2a, prohibits small requests from monopolizing the server, the use of the down-shifting approach allows larger, and thus, more profitable requests to be down-shifted to lower groups and occupy channels that would otherwise be dedicated to shorter requests.

Further embodiments of data scheduling arrangement in accordance with the present invention is described hereinafter in reference with FIGS. 4 and 5. In accordance with these embodiments clients (FIG. 1) generate requests that have arbitrary bandwidth requirements. As such server 10 allocates a variable portion of its bandwidth B in response to the bandwidth requirement of the client.

Figure 4:
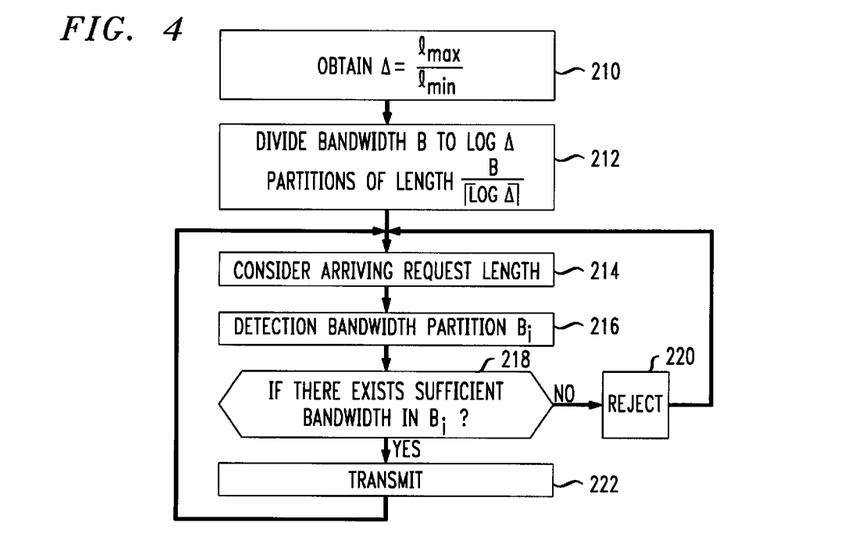
FIG. 4 is a flow chart of steps performed by a scheduling arrangement in accordance with still another embodiment of the present invention.

FIG. 4 is a flow chart of steps performed by a bandwidth prepartitioning (BP) scheduling arrangement as employed in accordance with one embodiment of the present invention. At step 210 admission control circuit 20 obtains a ratio A by dividing maximum length of a request $l_{max}$ to minimum length of a request $l_{min}$ as defined above. Thereafter, at step 212 admission control circuit 20 divides the total available bandwidth B of server 10 into $\lceil \log \Delta \rceil$ bandwidth partitions, wherein the size of each available bandwidth partition $B_i=B/\lceil \log \Delta \rceil$, wherein i ranges between bandwidth partition 1 to bandwidth partition $\lceil \log \Delta \rceil$.

It is noted that each of the available bandwidth partitions may be viewed, for example, as one or more allocated time slots for a server system that transmits data in a time division multiple access TDMA arrangement. In accordance with another example each of the available bandwidth partitions may be viewed as one or more allocated frequency bands for a server system that transmits data in a frequency division multiple access FDMA arrangement.

At step 214 admission control circuit 20 processes an incoming request, $\sigma_j$ and determines the length, $l_j$, of the clip that is requested. At step 118 admission control circuit determines the bandwidth partition i that is allocated to serve the incoming request based on the length $l_j$ such that $$2^{i-1} \cdot l_{min} \leq l_j < 2^i \cdot l_{min}$$

allowing for $l_j=2^i \cdot l_{min}$ if $i=\lceil \log \Delta \rceil$.

Once the bandwidth partition is determined, admission control circuit 20 goes to decision step 218 so as to determine whether there is an available free bandwidth partition that can serve the incoming request $\sigma_j$. If so, at step 222, admission control circuit 20 sends a transmit authorization signal to controller 22 so as to cause the transfer of the clip requested and returns to step 214 to monitor the next incoming request. Otherwise admission control circuit 20 goes to step 220 so as to cause a denial to transmit the clip requested and thereafter proceeds to step 214 to monitor the next incoming request.

Figure 5:
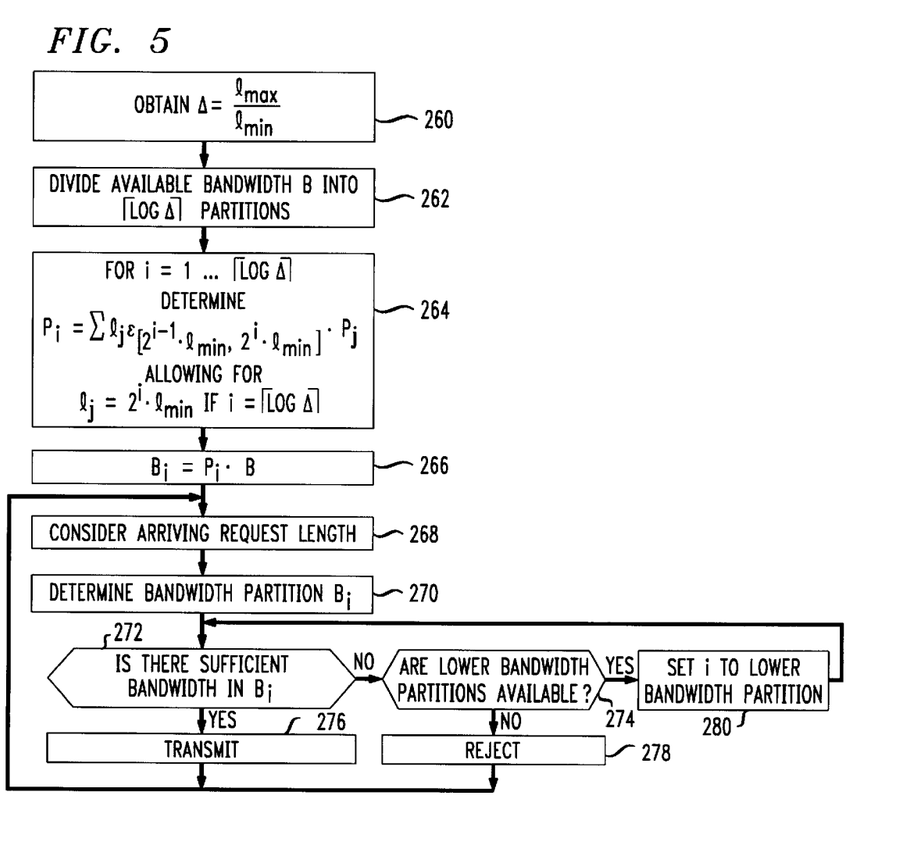
FIG. 5 illustrates a flow chart of the steps performed by a scheduling arrangement in accordance with another embodiment of the invention.

FIG. 5 illustrates a flow chart of the steps performed by a popularity-based bandwidth prepartitioning (PBP) data scheduling arrangement employed by admission control 20 in accordance with another embodiment of the invention that exhibits an improved performance compared to the bandwidth prepartitioning (BP) arrangement described above.

The popularity-based bandwidth prepartitioning (PBP) data scheduling arrangement includes the step of partitioning the total number of available bandwidths into i bandwidth partitions wherein i ranges from 1 to $\lceil \log \Delta \rceil$ as defined above. The size of the bandwidth partitions is based on the cumulative popularity of all requests with lengths in the range of $[2^{i-1} \cdot l_{min}, 2^i \cdot l_{min})$ allowing for $l_j = 2^i \cdot l_{min}$ if $i = \lceil \log \Delta \rceil$. In accordance with one embodiment of the invention these popularities may be estimated with reasonable accuracy, for example, by employing "moving window" prediction methods as described in T. D. C. Little and D. Venkatesh, *Popularity Based Assignment of Movies to Storage Devices in a Video-on-Demand System*, ACM Multimedia Systems, Vol. 2, pp 280–287 (1995), and incorporated herein by reference.

The popularity based bandwidth prepartitioning (PBP) data scheduling steps illustrated in FIG. 5 is based on the assumption that the products of the cumulative range popularities and the number of bandwidths are integers, although the invention is not limited in scope in that respect.

At step 260 admission control circuit 20 obtains a ratio A by dividing maximum length of a request $l_{max}$ to minimum length of a request $l_{min}$ as defined above. Thereafter, at step 262 admission control circuit 20 divides the total bandwidth B of server 10 into $\lceil \log \Delta \rceil$ bandwidth partitions, wherein i ranges from 1 to $\lceil \log \Delta \rceil$. The range of request lengths allocated to each bandwidth partition i is $[2^{i-1} \cdot l_{min}, 2^i \cdot l_{min})$ allowing for $l_j = 2^i \cdot l_{min}$ if $i = \lceil \log \Delta \rceil$.

The size of each bandwidth partition is determined in steps 264 and 266. Specifically at step 264, admission control circuit 20 for each length $l_j$ calculates a cumulative popularity $P_i$ for a bandwidth partition i, such that $$P_i = \Sigma l_j \cdot p_j$$

wherein $p_j$ is the probability that the length of an incoming request is $l_j$ in the $i^{th}$ range. As a result at step 266 admission control circuit 20 allocates the size of each bandwidth partition "i" as $P_i \cdot B$, wherein B is the total available bandwidth of server 20.

At step 268 admission control circuit 20 processes an incoming request, $\sigma_j$ and determines the length, $l_j$, of the clip that is requested. At step 270 admission control circuit determines the bandwidth partition i that is allocated to serve the incoming request based on the length $l_j$ such that $$2^{i-1} \cdot l_{min} \leq l_j < 2^i \cdot l_{min}$$

allowing for $l_j = 2^i \cdot l_{min}$ if $i = \lceil \log \Delta \rceil$.

Once the bandwidth partition is determined, admission control circuit 20 goes to decision step 272 and employs a down-shifting approach so as to determine whether there is sufficient bandwidth in bandwidth partition $B_i$. If so, admission control circuit 20 goes to step 276 so as to allocate the free bandwidth partition $B_i$ for transmission of the requested clip, and thereafter, returns to step 268 to consider the next client request. Otherwise at step 274, admission control circuit 20 determines whether there is sufficient bandwidth within the lower bandwidth partitions. By repeating steps 274, 280 and 272, each bandwidth partition lower than the initial allocated bandwidth is checked, and if one or more available bandwidth partitions exist to meet the request, admission control circuit 20 at step 272 allocates the free bandwidth partitions or fractions thereof for transmission of the requested clip at step 276. Thereafter admission control circuit 20 goes back to step 268 to process the next incoming request. If at step 274, admission control circuit 20 finally determines that there are no available free bandwidths in the lower groups, step 278 is performed to deny the incoming request. Thereafter, admission control circuit 20 goes back to step 268 to process the next incoming request. It is noted that a data structure based on the principles discussed in reference with FIG. 2b may be employed to set flags for "in-use" and "vacant" bandwidth partitions.

It is noted that the bandwidth prepartitioning (BP) scheduling arrangement described in FIG. 4 may also employ the down-shifting approach described above in reference with FIG. 5.

It is noted that in situations where the maximum bandwidth requirement of a clip is logarithmically small then the bandwidth partitioning (BP) scheduling arrangement exhibits a competitiveness in the order of $\lceil \log \Delta \rceil$, which is again an improvement over the greedy scheduling arrangement. Furthermore, an additional benefit of the popularity-based bandwidth prepartitioning (PBP) scheduling arrangement for variable bandwidth scenario is that by allowing requests to use fractions of the bandwidth allotted to lower partitions, the effects of bandwidth fragmentation can be reduced as compared to bandwidth partitioning (BP) scheduling arrangement.

Figure 6A:
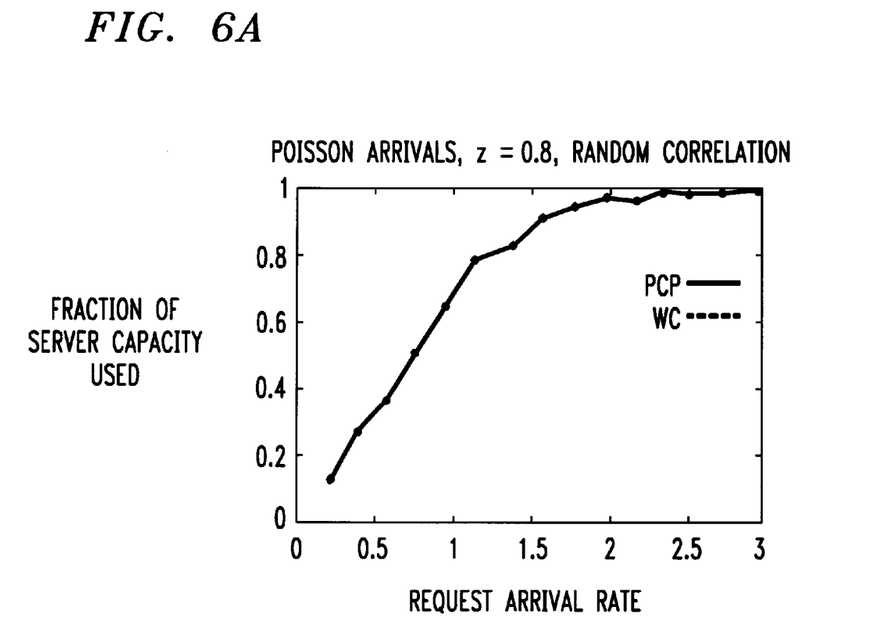
FIG. 6*a* is a plot illustrating the average performance of scheduling arrangement in accordance with one embodiment of the invention.
Figure 6B:
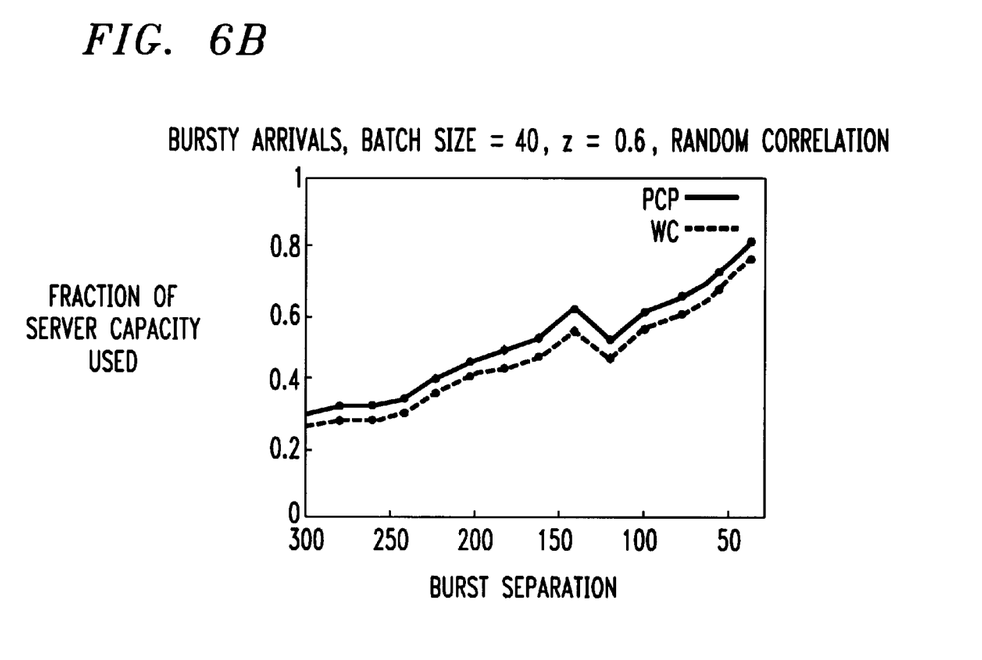
FIG. 6*b* is a plot illustrating the server utilization in accordance with one embodiment of the invention.
Figure 7A:
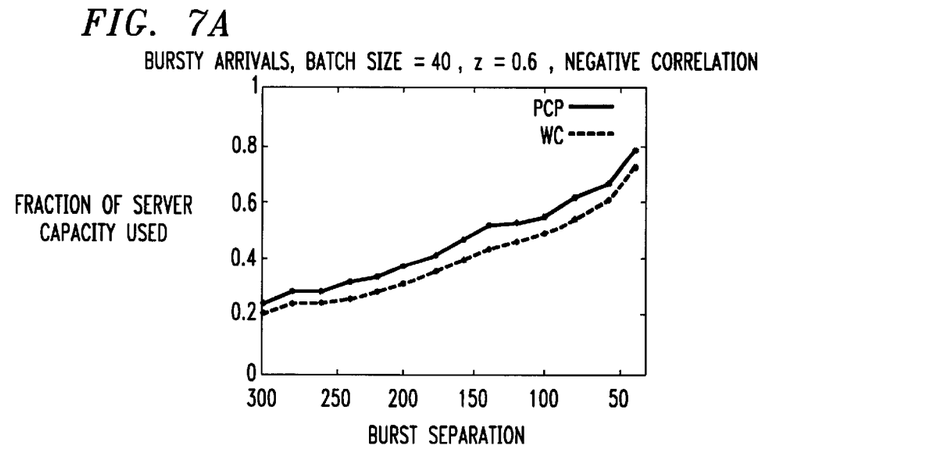
FIGS. 7*a*, 7*b* and 8 are plots illustrating the server utilization in accordance with various embodiments of the invention.
Figure 7B:
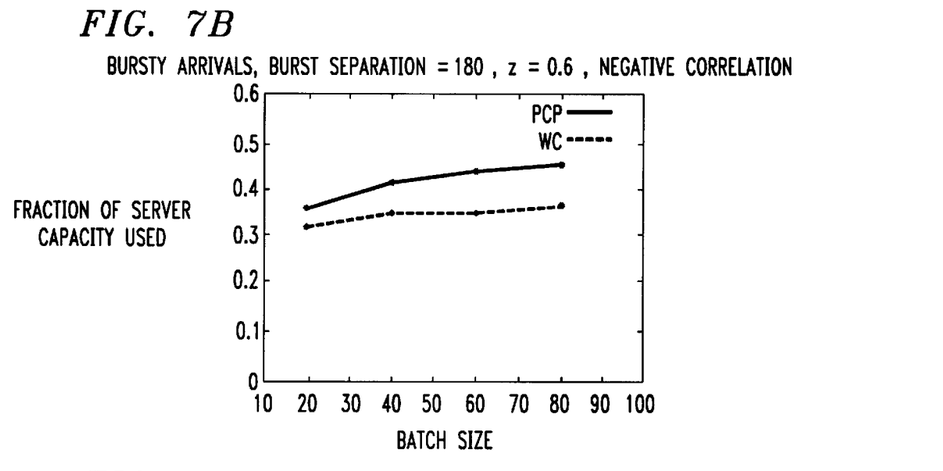
Figure 8:
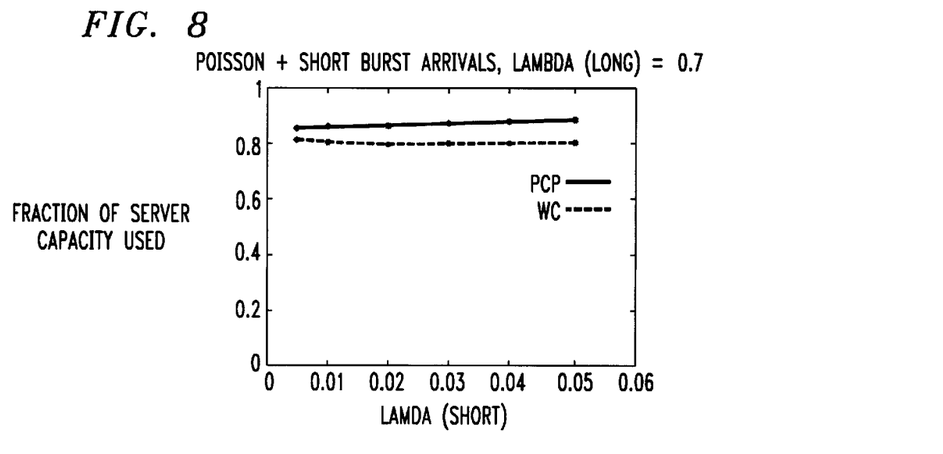

In order to examine the average-case behavior of the work conserving, or greedy, and prepartitioning arrangements, the results of data simulations that employ distinct random arrival patterns are illustrated in FIGS. 6–8. The random patterns include Poisson arrivals, Bursty arrivals and Poisson plus short burst arrivals, although it is appreciated that other probability models may be employed. For Poisson arrival scenario, the data simulation is based on the assumption that requests of different lengths arrive at the server according to a Poisson process model with an arrival rate of $\lambda$. This is a plausible probabilistic model for servers with a reasonably steady traffic flow, for example, such as video servers in scientific research labs serving clips of recorded experiments to scientists around the globe.

For Bursty arrival scenario, the data simulation is based on the assumption that requests of different lengths arrive at the server in bursts at regular intervals of time defined as burst separation. Each burst consists of a sequence of request batches, where each batch consists of requests of identical lengths arriving during a very short period of time. The batch arrivals are again modeled as a Poisson process with an arrival rate of $\lambda$. This scenario is intended to model "rush-hour traffic" situations in media-on-demand servers.

For Poisson plus short burst scenario, the data simulation is based on the assumption that long requests arrive at the server according to a Poisson process model with an arrival rate of $\lambda_{long}$. At the same time, bursts of short individual requests arrive based on a Poisson process model with an arrival rate of $\lambda_{short}$. This scenario combines some features of the previous two models. It is intended to represent situations where servers operating under a relatively steady flow of long requests, such as movies or sports events, occasionally have to handle bursts of short requests, such a the 6 o'clock news.

In the performed simulations, the request lengths were sampled from a discrete set of values between 5 and 150 minutes, with sampling probabilities taken from a Zipfian distribution model with skew parameter z as described in George Kingsley Zipf, *Human Behavior and the Principle of Least Effort—An Introduction to Human Ecology*, (Addison-Wesley Press, Inc. 1949), and incorporated herein by reference. The skew parameter may be varied from 0.0 (uniform) to 2.0 (severely skewed). Results were obtained for three different models of correlation between request lengths and popularities as follows: (1) Positive—larger popularities are assigned to longer request; (2) Negative—larger popularities are assigned to shorter requests; and (3) Random—no length/popularity exists: the values of Zipfian probability vector are assigned to the different request lengths in a random manner.

In the case of identical bandwidth requests, a server with 100 available channels was assumed. For the variable bandwidth case, a server with a sustained bandwidth capacity of 250 Megabits per second (Mbps) was assumed. The rate requirement of a request varied randomly between 500 Kbps and 8 Mbps. For each combination the system behavior was modeled under each scheduling arrangement in accordance with the present invention for 20,000 minutes of simulated time and 10 randomly generated request sequences.

FIG. 6a is a plot illustrating the average performance of the work conserving scheduling arrangement and popularity based channel prepartitioning (PCP) scheduling arrangement as a function of Poisson arrival rate $\lambda$ for z=0.8 and random length/rate correlation. As explained before for the worst case scenario (not illustrated) PCP scheduling arrangement exhibits a logarithmic improvement over WC arrangement. Furthermore, as illustrated in FIG. 6a, PCP is able to do at least as good as WC in all cases.

FIG. 6b is a plot illustrating the server utilization as a function of the burst separation interval for batch size equal to 40, z=0.6, batch arrival rate $\lambda$=0.8, burst size equal to 10, and random length/popularity correlation. As illustrated the burst separations decrease from left to right reflecting increasing load, as in FIG. 6a. The results show that under such conditions, popularity based channel prepartitioning (PCP) scheduling arrangement outperforms work conserving (WC) scheduling arrangement by an average margin of 7%–15%.

FIG. 7a is a plot illustrating the results of the same simulation except for negative length/popularity correlation; i.e. shorter requests are more popular. Under such scenarios, FIG. 7a illustrates the relative improvement offered by a popularity based channel prepartitioning (PCP) scheduling arrangement over work conserving (WC) scheduling arrangement, which is in the order of 20%–25%.

FIG. 7b is a plot illustrating the results wherein server utilization for the same parameter values and negative correlation, is given as a function of the batch size for a fixed burst separation of 180 minutes.

FIG. 8 is a plot illustrating the results for the situation wherein requests are arriving based on Poisson plus short bursts arrival process. An assumption was made that the server is working close to capacity serving requests for long movies, such as those having lengths of 90, 120, 150 minutes, and occasionally the server handles bursts of short requests such as those having lengths of 5, 10, and 15 minutes. $\lambda_{long}$ was selected to be large enough to ensure high system utilization. The server utilization was examined as a function of $\lambda_{short}$. All length popularities were assumed to be uniform. FIG. 8 illustrates that popularity-based channel prepartitioning (PCP) scheduling arrangement offers a 5%–10% performance improvement over WC, even at high levels of system utilization.

Thus, in accordance with various data scheduling arrangements employed by an admission control circuit in a server system, in accordance with the present invention, an improved result over work conserving scheduling arrangement can be achieved. Although the embodiments described above discuss partitioning channels or bandwidths, it will be appreciated that based on the principles of the present invention other server resources may be partitioned. For example, a request may also need a given amount of memory at the server in order to meet a predetermined quality of service requirement. The memory requirements can be either specified by the request or assigned by the server to meet the request's quality of service requirements. Given the limited amount of server memory, the admission control circuit needs to consider both the memory and the bandwidth requirements of a request, and prepartition those resources in accordance with the principles disclosed herein.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. In a server system having a predetermined total bandwidth providing data files to a plurality of clients in response to requests received from said clients, a method for providing admission control comprises the steps of:

dividing said predetermined total bandwidth into a plurality of channel partitions;

allocating said plurality of channel partitions to a plurality of channel groups such that each channel group includes one or more of said channel partitions;

obtaining a channel group number for a data file based on the length of said data file requested by one of said clients; and transmitting said requested data file when a channel group corresponding to said channel group number contains a vacant channel partition.

2. The method in accordance with claim 1 further comprising the step of denying transmittal of said requested data file when all channel partitions in said channel group are in-use.

3. The method in accordance with claim 1 wherein prior to said step of dividing, the method comprises the step of obtaining a ratio $\Delta$ corresponding to the longest specifiable duration of data, $l_{max}$, requested among said requests over the shortest specifiable duration of data, $l_{min}$, requested among said requests.

4. The method in accordance with claim 3 wherein said longest and shortest specifiable durations correspond respectively to the longest and shortest data files stored in said server system.

5. The method in accordance with claim 3 wherein said longest and shortest specifiable durations are provided by an administrator of said server system.

6. The method in accordance with claim 3 wherein said longest and shortest specifiable durations is dynamically obtained based on the length of files requested by a plurality of said clients.

7. The method in accordance with claim 3 wherein said channel partitions are divided into $\lceil \log \Delta \rceil$ channel groups and requests from said clients require the same bandwidth.

8. The method in accordance with claim 7 wherein each channel group contains the same number of channel partitions.

9. The method in accordance with claim 8 further comprising the step of allocating a channel group number "i" in response to a request based on the length of the data file requested, $l_j$, such that $2^{i-1} \cdot l_{min} \leq l_j < 2^i \cdot l_{min}$ allowing for $l_j = 2^i \cdot l_{min}$ if $i = \lceil \log \Delta \rceil$.

10. The method in accordance with claim 9 further comprising the steps of:
  searching for a vacant channel partition within channel groups equal and lower than said allocated channel group number "i"; and
  transmitting said requested data file when a vacant channel partition is located.

11. In a server system having a predetermined total bandwidth providing data files to a plurality of clients in response to requests received from said clients, a method for providing admission control comprises the steps of:
  dividing said predetermined total bandwidth into a plurality of channel partitions, wherein said number of channel partitions is based on the probability of file lengths requested by said plurality of clients;
  allocating said plurality of channel partitions to a plurality of channel groups such that each channel group contains a number of said channel partitions;
  obtaining a channel group number for a data file based on the length of said data file requested by one of said clients; and
  transmitting said requested data file when a channel group corresponding to said channel group number contains a vacant channel partition.

12. The method in accordance with claim 1 further comprising the step of denying transmittal of said requested data file when all channel partitions in said channel group are in-use.

13. The method in accordance with claim 11 wherein prior to said step of dividing, the method comprises the step of obtaining a ratio $\Delta$ corresponding to the longest specifiable duration of data, $l_{max}$, requested among said requests over the shortest specifiable duration of data, $l_{min}$, requested among said requests.

14. The method in accordance with claim 13 wherein said longest and shortest specifiable durations correspond respectively to the longest and shortest data files stored in said server system.

15. The method in accordance with claim 13 wherein said longest and shortest specifiable durations are provided by an administrator of said server system.

16. The method in accordance with claim 13 wherein said longest and shortest specifiable durations is dynamically obtained based on the length of files requested by a plurality of said clients.

17. The method in accordance with claim 13 wherein said channel partitions are divided into $\lceil \log \Delta \rceil$ channel groups and requests from said clients require the same bandwidth.

18. The method in accordance with claim 17 further comprising the step of:
  allocating a plurality of data file lengths, $l_j$, to one of said channel groups "i," such that the range of data file lengths in each channel group i is $2^{i-1} \cdot l_{min} \leq l_j < 2^i \cdot l_{min}$ allowing for $l_j = 2^i \cdot l_{min}$ if $i = \lceil \log \Delta \rceil$.

19. The method in accordance with claim 18 further comprising the step of calculating a cumulative probability $P_j = \Sigma l_j \cdot p_j$ wherein $l_j$ is the length of a data file allocated to said channel group i and $p_j$ is the probability that the length of an incoming request is $l_j$.

20. The method in accordance with claim 19 further comprising the step of allocating to each channel group a number of channel partitions $C_i$ equal to $P_i \times c$ for $i=1, \ldots, \lceil \log \Delta \rceil$, wherein c is the number of total available channels in said server.

21. The method in accordance with claim 20 further comprising the step of allocating a channel group number "i" in response to a request based on the length of the data file requested, $l_j$, such that $2^{i-1} \cdot l_{min} \leq l_j < 2^i \cdot l_{min}$ allowing for $l_j = 2^i \cdot l_{min}$ if $i = \lceil \log \Delta \rceil$.

22. The method in accordance with claim 21 further comprising the steps of:
  searching for a vacant channel partition within channel groups equal and lower than said allocated channel group number "i"; and
  transmitting said requested data file when a vacant channel partition is located.

23. In a server system having a predetermined total bandwidth providing data files to a plurality of clients in response to requests received from said clients, a method for providing admission control comprises the steps of:
  obtaining a ratio $\Delta$ corresponding to the longest specifiable duration of data, $l_{max}$, requested among said requests over the shortest specifiable duration of data, $l_{min}$, requested among said requests;
  dividing the total server bandwidth into $\lceil \log \Delta \rceil$ bandwidth partitions;
  obtaining a bandwidth partition number based on the length of a data file requested by one of said clients; and
  transmitting said requested data file when a bandwidth partition corresponding to said bandwidth partition number is vacant.

24. The method in accordance with claim 23 further comprising the step of denying transmittal of said requested data file when said bandwidth partition is in-use.

25. The method in accordance with claim 23 wherein said longest and shortest specifiable durations correspond respectively to the longest and shortest data files stored in said server system.

26. The method in accordance with claim 23 wherein said longest and shortest specifiable durations are provided by an administrator of said server system.

27. The method in accordance with claim 23 wherein said longest and shortest specifiable durations is dynamically obtained based on the length of files requested by a plurality of said clients.

28. The method in accordance with claim 23 further comprising the step of allocating a bandwidth partition number "i" in response to a request based on the length of the data file requested, $l_j$, such that $2^{i-1} \cdot l_{min} \leq l_j < 2^i \cdot l_{min}$ allowing for $l_j = 2^i \cdot l_{min}$ if $i = \lceil \log \Delta \rceil$.

29. The method in accordance with claim 28 further comprising the steps of:
  searching for a vacant bandwidth partition corresponding to a bandwidth partition number equal and lower than said allocated bandwidth partition number "i"; and
  transmitting said requested data file when a vacant bandwidth partition is located.

30. In a server system having a predetermined total bandwidth providing data files to a plurality of clients in response to requests received from said clients, a method for providing admission control comprises the steps of:

dividing said predetermined total bandwidth into a plurality of channel partitions;

allocating a size to said plurality of bandwidth partitions that defines said total bandwidth such that the size of each one of said bandwidth partition is based on the probability of file lengths requested by said plurality of clients;

obtaining a bandwidth partition number for a data file based on the length of said data file requested by one of said clients; and transmitting said requested data file when a bandwidth partition corresponding to said bandwidth partition number is vacant.

31. The method in accordance with claim 30 further comprising the step of denying transmittal of said requested data file when said bandwidth partition is in-use.

32. The method in accordance with claim 30 wherein prior to said step of dividing, the method comprises the step of obtaining a ratio $\Delta$ corresponding to the longest specifiable duration of data, $l_{max}$, requested among said requests over the shortest specifiable duration of data, $l_{min}$ requested among said requests.

33. The method in accordance with claim 32 wherein said longest and shortest specifiable durations correspond respectively to the longest and shortest data files stored in said server system.

34. The method in accordance with claim 32 wherein said longest and shortest specifiable durations are provided by an administrator of said server system.

35. The method in accordance with claim 32 wherein said longest and shortest specifiable durations is dynamically obtained based on the length of files requested by a plurality of said clients.

36. The method in accordance with claim 32 wherein the number of said bandwidth partitions is $\lceil \log \Delta \rceil$.

37. The method in accordance with claim 36 further comprising the step of:

allocating a plurality of data file lengths, $l_j$, to one of said bandwidth partitions, i, such that the range of data file lengths in each bandwidth partition i is $2^{i-1}.l_{min} \leq l_j < 2^i.l_{min}$ allowing for $l_j = 2^i.l_{min}$ if $i = \lceil \log \Delta \rceil$.

38. The method in accordance with claim 37 further comprising the step of calculating a cumulative probability $P_j = \Sigma l_j.p_j$ wherein $l_j$ is the length of a data file allocated to said bandwidth partition i and $p_j$ is the probability that the length of an incoming request is $l_j$.

39. The method in accordance with claim 38 further comprising the step of allocating to each bandwidth partition $B_i$ a size equal to $P_i \times B$ for $i=1, \ldots, \lceil \log \Delta \rceil$, wherein B is the total available bandwidth of said server.

40. The method in accordance with claim 39 further comprising the step of allocating a bandwidth number "i" in response to a request based on the length of the data file requested, $l_j$ such that $2^{i-1}.l_{min} \leq l_j < 2^i.l_{min}$ allowing for $l_j = 2^i.l_{min}$ if $i = \lceil \log \Delta \rceil$.

41. The method in accordance with claim 40 further comprising the steps of:

searching for a vacant bandwidth partition having a number equal or lower than bandwidth partition number "i"; and transmitting said requested data file when one or more vacant bandwidth partitions are located.

42. The method in accordance with claim 40 wherein said data file is transmitted via a portion of an available bandwidth partition based on the bandwidth requirement of a request received from one of said clients.

* * * * *